(12) United States Patent
Park (10) Patent No.: US 10,160,284 B2
(45) Date of Patent: Dec. 25, 2018

(54) AIR CONDITIONER OF VEHICLE

(71) Applicants: Hyundai Motor Company, Seoul (KR); KIA MOTORS CORP., Seoul (KR)

(72) Inventor: June Kyu Park, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 467 days.

(21) Appl. No.: 14/684,158

(22) Filed: Apr. 10, 2015

(65) Prior Publication Data

US 2016/0161154 A1 Jun. 9, 2016

(30) Foreign Application Priority Data

Dec. 5, 2014 (KR) .......... 10-2014-0174360

(51) Int. Cl.
*B60H 1/00* (2006.01)

(52) U.S. Cl.
CPC ..... *B60H 1/00021* (2013.01); *B60H 1/00899* (2013.01); *B60H 2001/00178* (2013.01)

(58) Field of Classification Search
CPC ...... B60H 1/00021; B60H 2001/00178; B60H 2001/00135; B60H 2001/00185; B60H 1/00899; B60H 1/00028
See application file for complete search history.

(56) References Cited

U.S. PATENT DOCUMENTS

| | | | | |
|---|---|---|---|---|
| 5,222,375 A * | 6/1993 | Conrad | ............... | B60H 1/3202 62/241 |
| 5,899,086 A * | 5/1999 | Noda | ............... | B60H 1/00914 165/42 |
| 5,910,157 A * | 6/1999 | Noda | ............... | B60H 1/00914 165/43 |
| 5,975,191 A * | 11/1999 | Ohashi | ............... | B60H 1/00035 165/43 |
| 6,093,096 A * | 7/2000 | Miyata | ............... | B60H 1/00021 454/139 |
| 6,352,102 B1 * | 3/2002 | Takechi | ............... | B60H 1/00064 165/203 |
| 6,581,022 B2 * | 6/2003 | Murakami | ............... | B60H 1/00735 62/133 |

(Continued)

FOREIGN PATENT DOCUMENTS

| | | |
|---|---|---|
| JP | 2010-013044 A | 1/2010 |
| JP | 2010-100140 A | 5/2010 |

(Continued)

OTHER PUBLICATIONS

Office Action issued in corresponding Korean Patent Application No. 10-2014-0174360, dated Dec. 9, 2015.

(Continued)

*Primary Examiner* — Kun Kai Ma
(74) *Attorney, Agent, or Firm* — McDermott Will & Emery LLP (57) ABSTRACT

An air conditioner of a vehicle includes a cooling line forming a cooling path of air, having an evaporator disposed therein, and discharging cooled air. A heating line forms a heating path of air, has a condenser that is disposed in the heating path and is connected with the evaporator, and discharges heated air.

9 Claims, 7 Drawing Sheets

(56) References Cited

U.S. PATENT DOCUMENTS

| | | | |
|---|---|---|---|
| 6,932,148 B1* | 8/2005 | Brummett | B60H 1/00378 123/142.5 R |
| 2004/0148953 A1* | 8/2004 | Kurata | B60H 1/00735 62/244 |
| 2005/0183855 A1* | 8/2005 | Izawa | B60H 1/00064 165/203 |
| 2005/0274138 A1* | 12/2005 | Golben | B60H 1/00585 62/480 |
| 2006/0080986 A1* | 4/2006 | Inoue | B60H 1/00057 62/259.2 |
| 2006/0242984 A1 | 11/2006 | Kang et al. | |
| 2009/0008467 A1* | 1/2009 | Ise | B60H 1/00735 237/2 A |
| 2009/0159256 A1* | 6/2009 | Isoda | B60H 1/00807 165/202 |
| 2009/0193830 A1* | 8/2009 | Yoshioka | B60H 1/0005 62/239 |
| 2010/0000713 A1* | 1/2010 | Takahashi | B60H 1/00899 165/61 |
| 2010/0301124 A1* | 12/2010 | Williams | B60H 1/0005 237/5 |
| 2011/0036117 A1* | 2/2011 | Frohling | B60H 1/00028 62/507 |
| 2013/0333406 A1* | 12/2013 | Takahashi | B60H 1/00921 62/238.7 |
| 2014/0075973 A1* | 3/2014 | Graaf | B60H 1/00328 62/115 |
| 2014/0075974 A1* | 3/2014 | Klein | B60H 1/3202 62/119 |
| 2014/0075975 A1* | 3/2014 | Graaf | B60H 1/00007 62/119 |
| 2015/0082820 A1* | 3/2015 | Takahashi | B60H 1/0005 62/238.7 |
| 2015/0360537 A1* | 12/2015 | Park | B60H 1/00742 165/203 |

FOREIGN PATENT DOCUMENTS

| | | | | |
|---|---|---|---|---|
| JP | 2010100140 A | * | 5/2010 | |
| JP | 2010-125912 A | | 6/2010 | |
| JP | 2010125912 A | * | 6/2010 | |
| JP | 2013-212829 A | | 10/2013 | |
| JP | 2013212829 A | * | 10/2013 | B60L 11/1874 |
| KR | 10-1999-0035243 A | | 5/1999 | |
| KR | 1019990035243 A | * | 5/1999 | |
| KR | 10-2012-0021142 A | | 3/2012 | |
| KR | 10-2012-0028572 A | | 3/2012 | |
| KR | 10-2012-0140101 A | | 12/2012 | |
| KR | 10-2014-0086686 A | | 7/2014 | |

OTHER PUBLICATIONS

Office Action issued in corresponding Korean Patent Application No. 10-2014-0174360, dated Apr. 21, 2016.

* cited by examiner

AIR CONDITIONER OF VEHICLE

CROSS REFERENCE TO RELATED APPLICATION

The present application claims the benefit of priority to Korean Patent Application No. 10-2014-0174360, filed on Dec. 5, 2014, the entire content of which is incorporated herein for all purposes by this reference.

TECHNICAL FIELD

The present disclosure relates to an air conditioner of a vehicle, and more particularly, the present disclosure relates to an air conditioner of a vehicle that performs heating or cooling, using a condenser and an evaporator.

BACKGROUND

An automotive air conditioner includes a blower that takes air from outside and blows it into an interior of a vehicle, a heater and an evaporator disposed in a flow path of the air sent by the blower for heating or cooling, and ducts that are connected to guide hot air and cold air to an upper portion or a lower portion of the vehicle interior.

However, such an air conditioner of the related art requires additional systems for cooling and heating and costs for the systems are excessively high. Further, it takes a considerable amount of energy to operate the systems, thus deteriorating fuel efficiency of the vehicle.

The foregoing is intended merely to aid in the understanding of the background, and is not intended to mean that the present disclosure falls within the purview of the related art that is already known to those skilled in the art.

SUMMARY

The present disclosure has been made keeping in mind the above problems occurring in the related art, and the present disclosure discloses an air conditioner of a vehicle that can cool and heat an interior of a vehicle, using only one system for cooling and heating.

According to one aspect of the present inventive concept, an air conditioner of a vehicle includes a cooling line forming a path for cooled air and having an evaporator that is disposed in the cooled air path. The cooling line discharges the cooled air. A heating line forms a path for heated air and has a condenser that is disposed in the heated air path and is connected with the evaporator. The heating line discharges the heated air.

The air conditioner may further include a sub-condenser connected with the evaporator in the cooling line. The evaporator has a refrigerant passing therethrough. The refrigerant is compressed, and the compressed refrigerant is supplied to the condenser and the sub-condenser before the refrigerant returns to the evaporator.

The cooling line may include a cooling-side blower disposed therein to deliver external air to an interior of the vehicle after the external air passes through the evaporator. A heating line may include a heating-side blower disposed therein to deliver the external air to the interior of the vehicle after being heated.

The air conditioner may further include a sub-condenser connected with the evaporator in the cooling line. The cooling-side blower may be disposed between the sub-condenser and the evaporator. The cooling-side blower sucks in the external air and sends the external air to the sub-condenser and the evaporator. The air, which passes through the evaporator, may flow to the interior of the vehicle, and the air, which passes through the sub-condenser, may be discharged out of the cooling line.

The air conditioner may further include a heater disposed in the heating line to heat the air in the heating line. The heating-side blower may be disposed between the condenser and the heater to send the external air to the interior of the vehicle through the condenser and the heater.

The cooling line and the heating line may have, respective vents to communicate with an outside and respective doors covering the vents and guiding the cooled or heated air to the outside of the cooling line and the heating line through the vents, when the door is open.

The air conditioner may further include a controller configured to control opening and closing of the doors. The controller may close the door of the cooling line and open the door of the heating line when an interior of the vehicle reaches a first reference temperature. The air conditioner may further include a circulation line for supplying air from the interior of the vehicle to the evaporator. A circulation door opens and closes a vent between the circulation line and the cooling line. The controller may open the circulation door so that the circulation line and the cooling line communicate with each other, in accordance with the first reference temperature for the interior of the vehicle.

The air conditioner may further include a controller configured to control opening and closing of the doors. The controller may close the door of the heating line and open the door of the cooling line when an interior of the vehicle reaches a second reference temperature.

The air conditioner may further include a circulation line for supplying air from the interior of the vehicle to the evaporator. A circulation door opens and closes a vent between the circulation line and the cooling line. The controller may open the circulation door to supply the air from the interior of the vehicle to the evaporator when a temperature of external air is a predetermined temperature or less.

The cooling line and the heating line may be arranged in one air-conditioning line.

According to the air conditioner of a vehicle having the structure described above, it is possible to achieve both cooling and heating, using a single air-conditioning system of the vehicle. Therefore, it is possible to reduce the cost and improve fuel efficiency, as compared with using additional systems for cooling and heating.

Further, the configuration of the system is simplified, thus simplifying control and manufacturing.

BRIEF DESCRIPTION OF THE DRAWINGS

The above and other objects, features and other advantages of the present disclosure will be more clearly understood from the following detailed description when taken in conjunction with the accompanying drawings.

DETAILED DESCRIPTION

An air conditioner of a vehicle according to an embodiment of the present disclosure is described hereafter with reference to the accompanying drawings.

Figure 1:
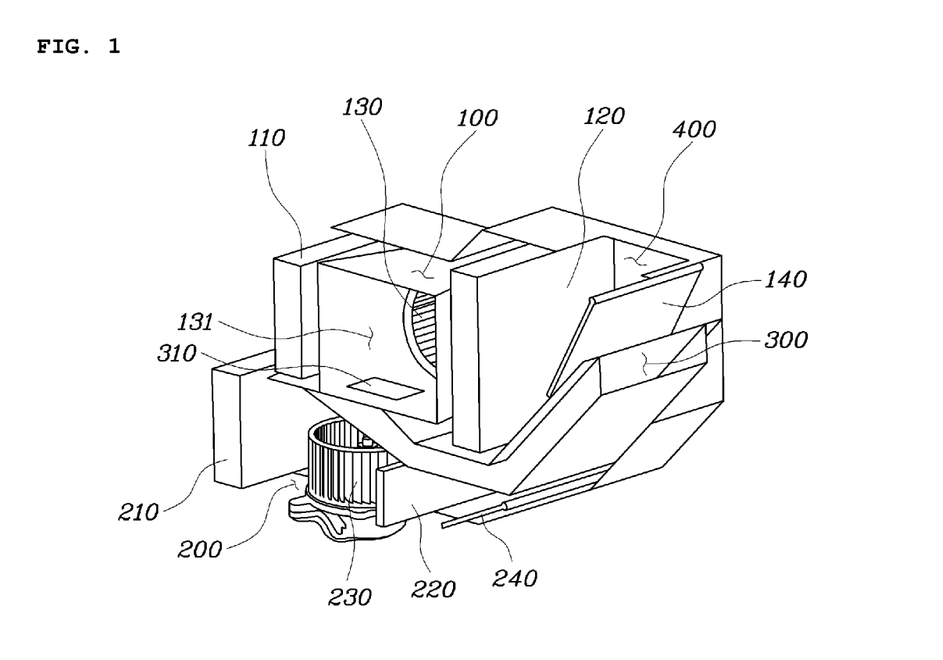
FIG. 1 is a view showing an air conditioner of a vehicle according to an embodiment of the present inventive concept.
Figure 2:
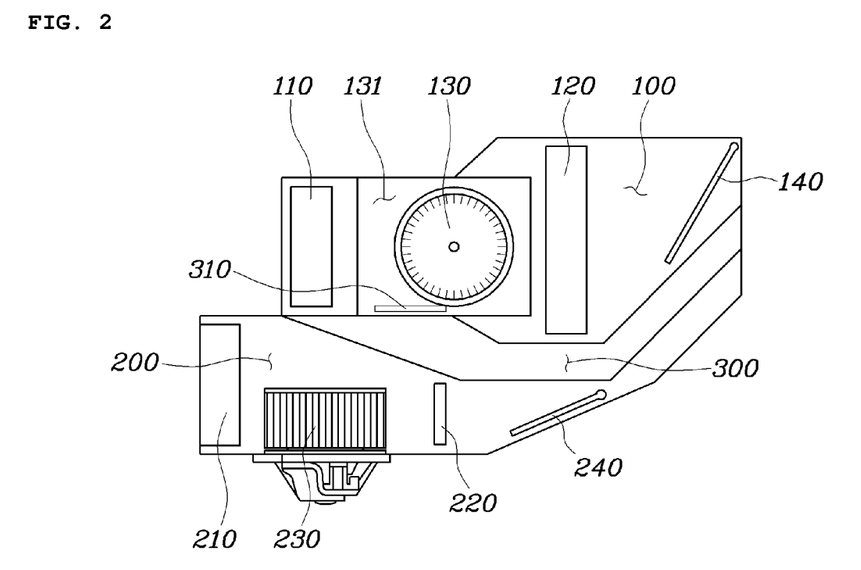
FIG. 2 is a cross-sectional view of the embodiment of FIG. 1.

FIG. 1 is a view showing an air conditioner of a vehicle according to an embodiment of the present inventive concept, and FIG. 2 is a cross-sectional view of the embodiment of FIG. 1. The air conditioner of a vehicle according to the embodiment of the present disclosure includes a cooling line 100 that has an evaporator 120 disposed in an air path and discharges cooled air. A heating line 200 has a condenser 210 disposed in the air path and connected with the evaporator 120 and discharges heated air. A sub-condenser 110 is connected with the evaporator 120 and disposed in the cooling line 100. A refrigerant passes through the evaporator 120 and returns to the evaporator 120 after being compressed and supplied to the condenser 210 and the sub-condenser 110. The air conditioner of the present disclosure includes the sub-condenser 110 for improvement of heat discharge efficiency and improvement of cooling performance of the evaporator 120.

In detail, the evaporator 120, the condenser 210, and the sub-condenser 110 are connected to each other as one unit. The condenser 210 and the sub-condenser 110 receive heat from the refrigerant compressed through a compressor (not shown) and the refrigerant condensed through the condenser 210. The sub-condenser 110 receives the heat through the evaporator 120 after passing through an expansion valve (not shown), such that air passing through the evaporator 120 can be cooled. Further, the air coming out of the evaporator 120 flows back to the compressor and is then distributed to the condenser 210 and the sub-condenser 110.

The condenser 210 and the sub-condenser 110 may be independently connected to the compressor so that they can independently receive compressed refrigerant. Heat is transferred uniformly to the condensers and the heat discharge efficiency is improved, thus considerably increasing the cooling performance of the evaporator 120.

The amounts of refrigerant supplied to the condenser 210 and the sub-condenser 110 may be set differently. In this case, heating efficiency may increase by the heating line 200 and a loss of heat may be reduced by increasing the amount of refrigerant supplied to the condenser 210 to discharge more heat.

In another embodiment, the condenser 210 and the sub-condenser 110 may communicate with each other such that a compressed refrigerant flows through any one of the condenser 210 and the sub-condenser 110 and then through the other one to increase heating efficiency by the heating line 200 and reduce heat loss by delivering the refrigerant to the sub-condenser 110 after passing through the condenser 210.

As described above, it is possible to improve energy-saving efficiency and achieve even heating with one air-conditioning system as compared with using an additional main heat source by using the heat generated in the condenser 210, which is not used in the related art, as a heat source for the heating line 200, and thus, there is no need for an additional heating system.

Figure 3:
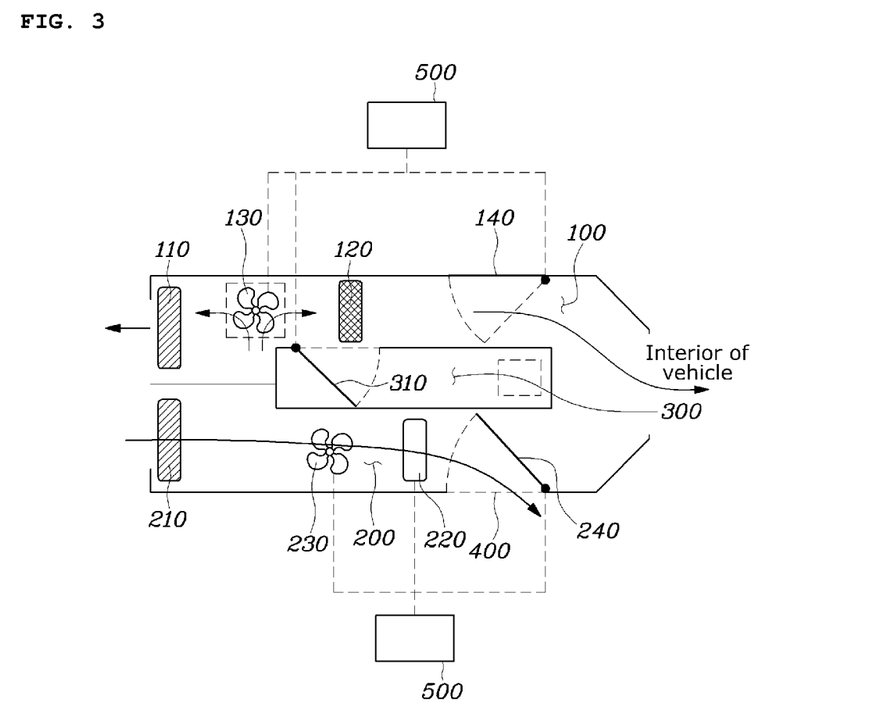
FIG. 3 is a schematic view showing the air conditioner of a vehicle according to an embodiment of the present inventive concept.

FIG. 3 is a schematic view showing the air conditioner of a vehicle according to an embodiment of the present inventive concept. As shown in FIGS. 1 to 3, a cooling-side blower 130 may be disposed in the cooling line 100 so that external air can be sent to the vehicle interior after passing through the evaporator 120, and a heating-side blower 230 may be disposed in the heating line 200 so that external air can be sent to the vehicle interior after passing through the condenser 210 and then being heated.

First ends of the cooing line 100 and the heating line 200 are connected to the interior of the vehicle so that cooled air and heated air in the lines 100 can be discharged to the vehicle interior, and a second end of the heating line 200 communicates with outside so that air can flow into the heating line 200.

Figure 4:
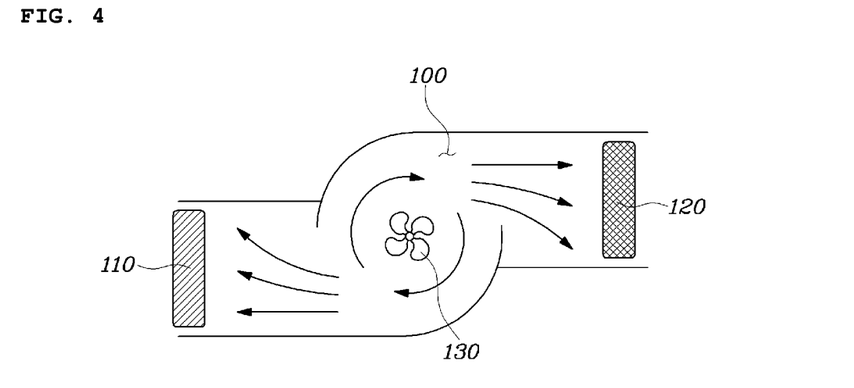
FIG. 4 is a view showing the operation of blowing air by a cooling blower.

FIG. 4 is a view showing the operation of blowing air by a cooling blower. The cooling-side blower 130 disposed between the sub-condenser 110 and the evaporator 120 delivers the external air inside and sends it to the sub-condenser 110 and the evaporator 120. The air passing through the evaporator 120 flows to the interior of the vehicle, and the air passing through the sub-condenser 110 is discharged out of the cooling line 100.

The second end of the heating line 100 may communicate with the outside so that the air heated through the sub-condenser 110 is discharged outside, or may be connected with the heating line 200 so that the air heated through the sub-condenser 110 flows into the heating line 200. Further, a separate supply line 131 supplying the external air to the cooling-side blower 130, as shown in FIG. 1, may be disposed in the heating line 100 so that external air can flow to the cooling-side blower 130.

As shown in FIG. 3, a heater 220 that heats the air in the heating line 200 is disposed in the heating line 200, and the heating-side blower 230 is disposed between the condenser 210 and the heater 220 so that external air can flow to the interior of the vehicle through the condenser 210 and the heater 220.

The condenser 210 and the heater 220 may be sequentially arranged from the second end to the first end of the heating line 220, and the cooling-side blower 230 generates airflow in the heating line 200 by receiving air from the condenser 210 and discharging it to the heater 220. Since the heating-side blower 230 is positioned behind the heater 220 in an airflow direction, the air heated through the heater 220 is prevented from being discharged directly to the heating-side blower 230, such that it is possible to prevent damage to the heating-side blower 230 and increase the lifespan of the heating-side blower 230.

Various types of heaters such as a heater using cooling water of a vehicle or a positive thermal coefficient (PTC) heater using electricity may be used for the heater 220. The heater 220 may not be operated in the way described above but controlled appropriately in accordance with the external air temperature of other set conditions. The heater 220 may control temperature.

The cooling line 100 and the heating line 200 each may have a vent 400 to communicate with the outside. Doors 140 and 240 may close vents 400 and guide cooled or heated air to the outside of the lines 100 and 200 through the vents 400 when the doors 140 and 240 are open.

The doors 140 and 240 are hinged to edges of the vents 400 to be able to flip as a door flap and block the lines 100 and 200, respectively, by flipping toward insides of the lines 100 and 200, when they are open, but they are not limited thereto and may be implemented in various ways.

Motors (not shown) that turn the doors 140 and 240 to open/close may be provided for the doors 140 and 240, and the motors may be controlled by a controller 500 to turn the doors 140 and 240 so that the doors are opened in accordance with set conditions. In the present disclosure, although motors are used for operating the doors 140 and 240, various actuators may be used to open/close the doors 140 and 240, depending on types of the doors 140 and 240.

Figure 5:
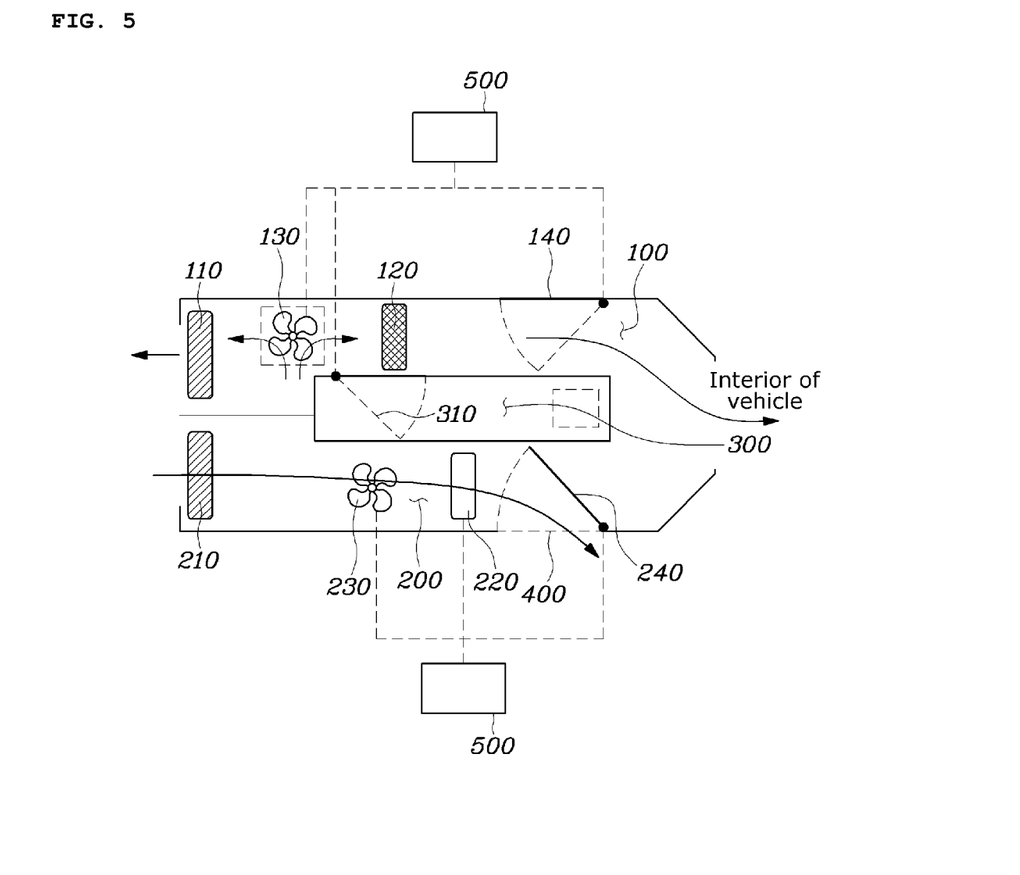
FIGS. 5 and 6 are views showing cooling air flows by the air conditioner of a vehicle according to an embodiment of the present inventive concept.
Figure 6:
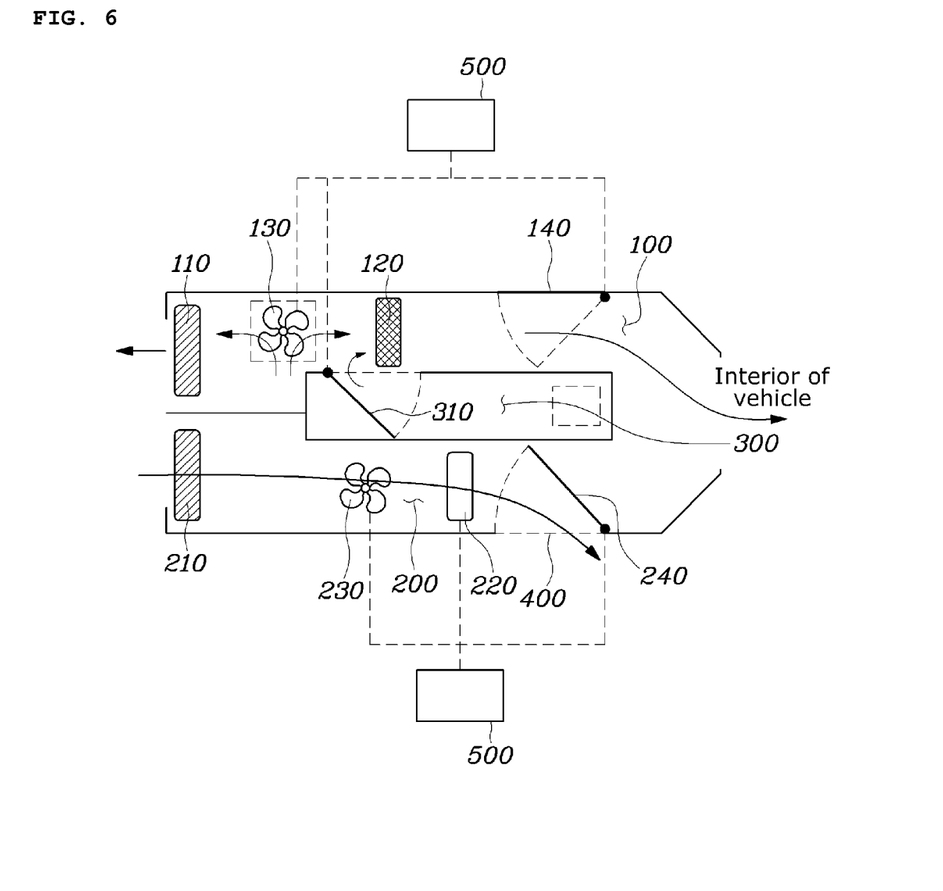

FIGS. 5 and 6 are views showing air flows in cooling by the air conditioner of a vehicle according to an embodiment of the present inventive concept, in which FIG. 5 shows normal cooling and FIG. 6 shows more intensive cooling.

Referring to FIG. 5, in normal cooling, the controller 500 closes the cooling line door 140 and opens the heating line door 240 in cooling of the vehicle interior. Thus, the air cooled through the evaporator 120 flows to the interior of the vehicle, and the air heated through the condenser 210 in the heating line 200 is guided to outside through the vent 400 by the heating line door 240. When a temperature higher than that at an outlet of the evaporator 120, which is adjusted by a user, is required, the controller 500 discharge the air at the required temperature by controlling the amount of opening/closing of the heating line door 240 to mix some of the heated air in the heating line 200 with the cooled air.

Referring to FIG. 6, a circulation line 300 for supplying the air inside the vehicle to the evaporator 120 and a circulation door 310 for opening/closing a vent between the circulation line 300 and the cooling line 100 are further provided, and the controller 500 can open the circulation door 310 for the circulation line 300 and the cooling line 100 to communicate with each other.

In some cases, cooled air at a temperature lower than the temperature at the outlet of the evaporator 120 may be required. Here, the air inside the vehicle can be cooled at the lower temperature by opening the circulation door 310 and cooling some of the air through the evaporator 120. The vent between the circulation line 300 and the cooling line 100 may be formed at the cooling-side blower 130 or between the cooling-side blower 130 and the evaporator 120 to circulate the air back to the evaporator 120.

The controller 500 may control the amount of opening/closing of the circulation door 310 in accordance with the required temperature.

Figure 7:
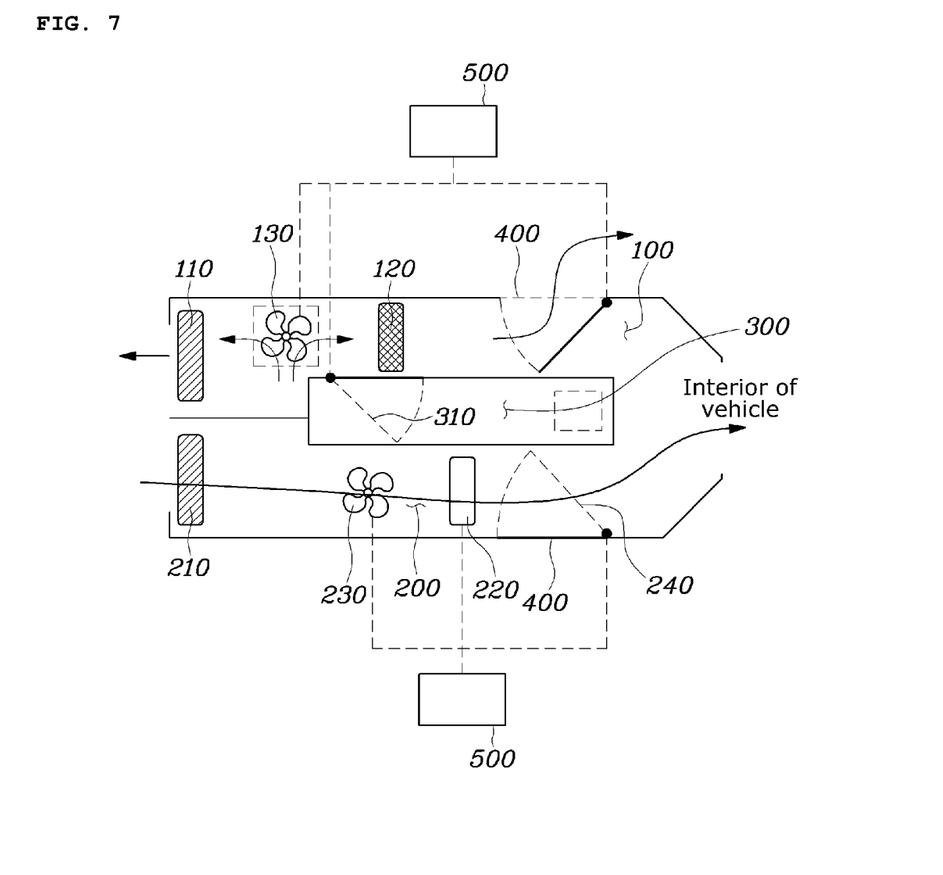
FIGS. 7 and 8 are views showing heating air flows by the air conditioner of a vehicle according to an embodiment of the present inventive concept.
Figure 8:
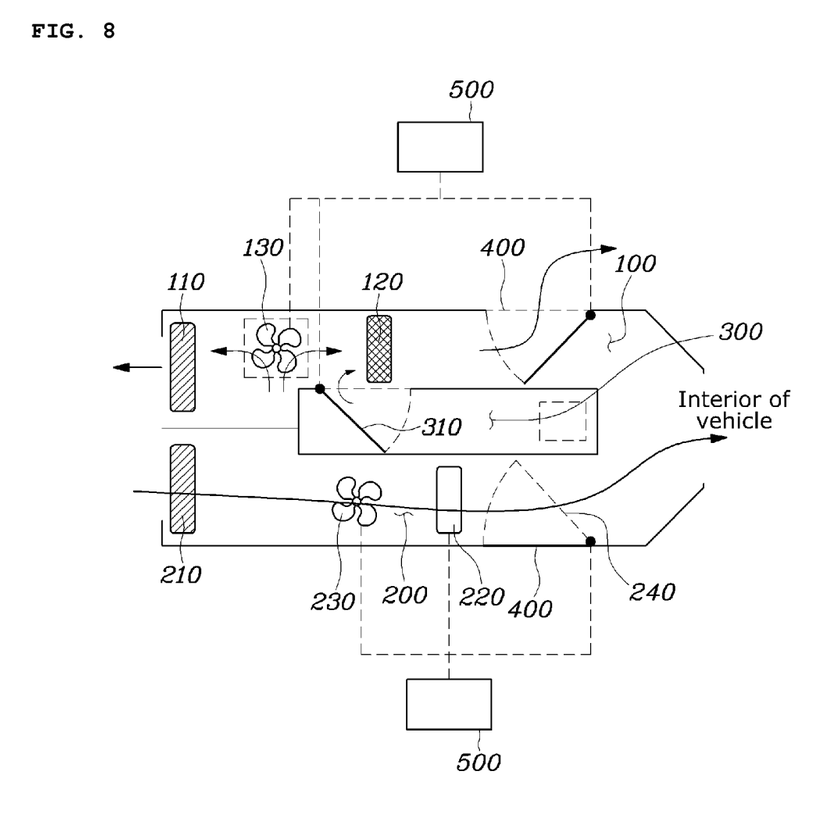

FIGS. 7 and 8 are views showing air flows in heating by the air conditioner of a vehicle according to an embodiment of the present inventive concept, in which FIG. 7 shows normal heating and FIG. 8 shows heating when a temperature of external air drops under a predetermined temperature.

As shown in FIG. 7, the controller 500 can close the heating line door 240 and open the cooling line door 140 when the interior of the vehicle is heated. Accordingly, the heated air can flow to the interior of the vehicle through the heating line 200, and the air cooled through the evaporator 120 can be guided to the outside through the cooling line 100 by the cooling line door 140.

When a temperature lower than the temperature of the air discharged from the heating line 200 is required in accordance with a temperature control, the controller 500 controls the amount of opening/closing of the cooling line door 140 so that some of the cooled air can be mixed with the air discharged from the heating line 200 and then can flow to the interior of the vehicle.

In some cases, when a temperature higher than the temperature of the air discharged from the heating line 200 is required, the controller 500 may increase the temperature of the discharged air by operating the heater 220.

The evaporator 120 may maintain cooling even in heating of the vehicle, and thus, the evaporator 120 may be damaged or broken by overcooling due to the external air and self-cooling even when the temperature of the external air is equal to or less than a predetermined temperature, for example, 20 degrees below zero. Accordingly, the controller 500 may open the circulation door 310 such that the air inside the vehicle is supplied to the evaporator 120 when the temperature of the external air is the predetermined temperature or less in order to maintain the lifespan of the evaporator 120. In this case, since the temperature of the air inside the vehicle is higher than the temperature of the external air, overcooling of the evaporator 120 can be prevented by supplying the interior air to the evaporator 120.

The predetermined temperature may be set to various levels by experiments according to the state and type of the evaporator 120.

Although opening/closing the doors 140, 240, and 310 in accordance with temperatures required under some situations was described in the embodiments, opening/closing the doors 140, 240, and 310 is not limited thereto and may be achieved in various combinations.

Further, although the doors 140, 240, and 310 each are configured as one part in the embodiments, they may be composed of a plurality of doors, and in this case, the doors 140, 240, 310 may be independently opened/closed or door having the same purposes may be opened/closed together by the controller 500.

The cooling-side blower 130 and the heating-side blower 230 may be independently controlled by the controller 500 and may be controlled in accordance with various required conditions such as a required amount of airflow or a required amount of cooling. Since the condenser 210 and the evaporator 120 keep operating regardless of heating or cooling of the interior of the vehicle, the cooling-side blower 130 and the heating-side blower 230 may keep operating irrespective of heating or cooling.

Further, the heating line 200 and the cooling line 100, which are independent channels, may have ends that communicate with each other to mix the discharged air, or they may be achieved in one air-conditioning module in one air-conditioning line. For example, the heating line 200 and the cooling line 100 may have independent passages, respectively, with an air-conditioning line housing at the outside, or they may be achieved by disposing a separator in an air-conditioning line housing. That is, the air-conditioning line may be achieved by combining the heating line 200 and the cooling line 100, and the heating line 200 and the cooling line 100 may use the same passage and be separated by a separator to have independent lines.

According to the air conditioner of a vehicle having the structure described above, it is possible to achieve both of cooling and heating, using one air-conditioning system of a vehicle. Therefore, it is possible to reduce cost and improve fuel efficiency, as compared with using additional systems for cooling and heating.

Further, the configuration is simplified, thus simplifying a control of the air conditioner and manufacturing.

Although an embodiment of the present disclosure has been described for illustrative purposes, those skilled in the art will appreciate that various modifications, additions and substitutions are possible, without departing from the scope and spirit of the invention as disclosed in the accompanying claims.

What is claimed is:

1. An air conditioner of a vehicle, comprising:
a cooling line forming a cooled air path and having an evaporator that is disposed in the cooled air path, the cooling line discharging the cooled air;
a heating line forming a heated air path having a condenser that is disposed in the heated air path and is connected with the evaporator, the heating line discharging the heated air;
a heater disposed in the heating line to heat the air in the heating line; and
a circulation line for supplying air from an interior of the vehicle to the evaporator,
wherein the cooling line includes a cooling-side blower disposed therein to deliver external air to the interior of the vehicle after the external air passes through the evaporator and away from the interior of the vehicle toward a sub-condenser, and
the heating line includes a heating-side blower disposed therein to deliver the external air to the interior of the vehicle after being heated by passing through the condenser, wherein the heating-side blower is disposed between and adjacent to the condenser and the heater and sends the external air to the interior of the vehicle through the condenser and the heater.

2. The air conditioner of claim 1, further comprising: the sub-condenser connected with the evaporator in the cooling line, wherein a refrigerant having passed through the evaporator returns to the evaporator after being compressed and supplied to the condenser and the sub-condenser.

3. The air conditioner of claim 1, further comprising: the sub-condenser connected with the evaporator in the cooling line, wherein the cooling-side blower is disposed between the sub-condenser and the evaporator, and the cooling-side blower sucks in the external air and sends the external air to the sub-condenser and the evaporator, and wherein the external air, which passes through the evaporator, flows to the interior of the vehicle, and the external air, which passes through the sub-condenser, is discharged from the cooling line.

4. The air conditioner of claim 1, wherein the cooling line and the heating line have respective vents to communicate with an outside and respective doors covering the vents and guiding cooled or heated air to the outside of the cooling line and the heating line through the vents, when being open.

5. The air conditioner of claim 4, further comprising:
a controller for controlling opening and closing of the doors,
wherein the controller closes the door of the cooling line and opens the door of the heating line, when an interior of a vehicle is cooled.

6. The air conditioner of claim 5, further comprising:
a circulation door for opening and closing a vent between the circulation line and the cooling line,
wherein the controller opens the circulation door so that the circulation line and the cooling line communicate with each other, in accordance with a required degree of cooling the interior of the vehicle.

7. The air conditioner of claim 4, further comprising:
a controller for controlling opening and closing of the doors,
wherein the controller closes the door of the heating line and opens the door of the cooling line, when an interior of a vehicle is heated.

8. The air conditioner of claim 7, further comprising:
a circulation door for opening and closing a vent between the circulation line and the cooling line,
wherein the controller opens the circulation door so that air in the vehicle is supplied to the evaporator, when a temperature of external air is a predetermined temperature or less.

9. The air conditioner of claim 1, wherein the cooling line and the heating line are arranged in one air-conditioning line.

* * * * *